(12) United States Patent
Chen et al.

(10) Patent No.: US 12,253,902 B2
(45) Date of Patent: Mar. 18, 2025

(54) POWER CONSUMPTION CONTROL DEVICE APPLIED TO ELECTRONIC DEVICE AND ASSOCIATED METHOD

(71) Applicant: MEDIATEK INC., Hsin-Chu (TW)

(72) Inventors: Ming-Yu Chen, Hsinchu (TW); Yen-Hsiang Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 42 days.

(21) Appl. No.: 18/134,541

(22) Filed: Apr. 13, 2023

(65) Prior Publication Data

US 2024/0103602 A1    Mar. 28, 2024

Related U.S. Application Data

(60) Provisional application No. 63/408,868, filed on Sep. 22, 2022.

(51) Int. Cl.
*G06F 1/32* (2019.01)
*G06F 1/3296* (2019.01)

(52) U.S. Cl.
CPC .................. *G06F 1/3296* (2013.01)

(58) Field of Classification Search
CPC ..... G06F 1/3296; G06F 1/3231; G06F 1/3206
See application file for complete search history.

(56) References Cited

U.S. PATENT DOCUMENTS

| 7,302,089 | B1 * | 11/2007 | Smits | ................ | H04W 52/0251 |
| | | | | | 382/218 |
| 2011/0134251 | A1 * | 6/2011 | Kim | ...................... | H04N 23/23 |
| | | | | | 348/E5.09 |
| 2014/0160019 | A1 * | 6/2014 | Anda | ...................... | G06F 3/013 |
| | | | | | 345/158 |
| 2017/0010677 | A1 | 1/2017 | Roh | | |
| 2018/0287808 | A1 | 10/2018 | Liston | | |

FOREIGN PATENT DOCUMENTS

| CN | 104331149 A | 2/2015 |
| CN | 105759935 A | 7/2016 |
| TW | 201545059 A | 12/2015 |
| TW | 201716926 A | 5/2017 |
| TW | 201913417 A | 4/2019 |

\* cited by examiner

*Primary Examiner* — Stefan Stoynov
(74) *Attorney, Agent, or Firm* — Winston Hsu

(57) ABSTRACT

A power consumption control device applied to an electronic device includes an image signal processor (ISP), a storage device, a processing circuit, and a control circuit. The ISP is arranged to receive an image signal captured by a camera of the electronic device, and process the image signal to generate a processed image signal. The storage device is arranged to store at least one predetermined image class. The processing circuit is arranged to analyze the processed image signal to detect whether the processed image signal belongs to the at least one predetermined image class to generate a control signal. The control circuit is arranged to switch a mode of the electronic device to a first mode or a second mode according to the control signal, wherein power consumption and performance of the electronic device in the first mode are lower than that in the second mode.

24 Claims, 3 Drawing Sheets

POWER CONSUMPTION CONTROL DEVICE APPLIED TO ELECTRONIC DEVICE AND ASSOCIATED METHOD

CROSS REFERENCE TO RELATED APPLICATIONS

This application claims the benefit of U.S. Provisional Application No. 63/408,868, filed on Sep. 22, 2022. The content of the application is incorporated herein by reference.

BACKGROUND

The present invention is related to power consumption control, and more particularly, to a power consumption control device applied to an electronic device, which can reduce power consumption or increase performance of the electronic device by switching a mode of the electronic device.

With technology develops, for an electronic device with a limited battery size (e.g. a portable electronic device, such as a mobile phone and a laptop), a processor of the electronic device may need to consume more power to process complex calculations, and a display of the electronic device may need to display images with higher resolution and/or higher frame rate. However, when a user is not using the electronic device or looking at the display of the electronic device, the processor and the display may still be consuming power, which may reduce the efficiency of the electronic device and increase unnecessary power consumption. As a result, a power consumption control device applied to an electronic device that can reduce power consumption or increase performance of the electronic device by switching a mode of the electronic device is urgently needed.

SUMMARY

It is therefore one of the objections of the present invention to a power consumption control device applied to an electronic device and an associated method, to address the above-mentioned issues.

According to an embodiment of the present invention, a power consumption control device applied to an electronic device is provided. The power consumption control device comprises an image signal processor (ISP), a storage device, a processing circuit, and a control circuit. The ISP is arranged to receive an image signal from a camera of the electronic device, and process the image signal to generate a processed image signal. The storage device is arranged to store at least one predetermined image class. The processing circuit is arranged to: receive the processed image signal from the ISP; receive the at least one predetermined image class from the storage device; and analyze the processed image signal to detect whether the processed image signal belongs to the at least one predetermined image class to generate a control signal. The control circuit is arranged to switch a mode of the electronic device to a first mode or a second mode according to the control signal, wherein power consumption and performance of the electronic device in the first mode are lower than the power consumption and the performance of the electronic device in the second mode.

According to an embodiment of the present invention, a power consumption control method for an electronic device is provided. The power consumption control method comprises: receiving an image signal from a camera of the electronic device, and processing the image signal to generate a processed image signal; analyzing the processed image signal to detect whether the processed image signal belongs to at least one predetermined image class to generate a control signal; and switching a mode of the electronic device to a first mode or a second mode according to the control signal, wherein power consumption and performance of the electronic device in the first mode are lower than the power consumption and the performance of the electronic device in the second mode.

One of the benefits of the present invention is that the power consumption control device of the present invention can analyze the processed image signal to detect whether the processed image signal belongs to the at least one predetermined image class. In response to the processed image signal not belonging to the at least one predetermined image class (e.g. when the user of the electronic device is not using or looking at the electronic device), the power consumption control device can switch the mode of the electronic device to the low power mode, which can reduce unnecessary power consumption of the electronic device. In response to the processed image signal belonging to the at least one predetermined image class (e.g. when the user of the electronic device is using or looking at the electronic device), the power consumption control device can switch the mode of the electronic device to the high performance mode, which can enhance the performance of the electronic device and improve user experience. In this way, by adaptively switching the mode of the electronic device between the low power mode and the high performance mode, the efficiency of the electronic device can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
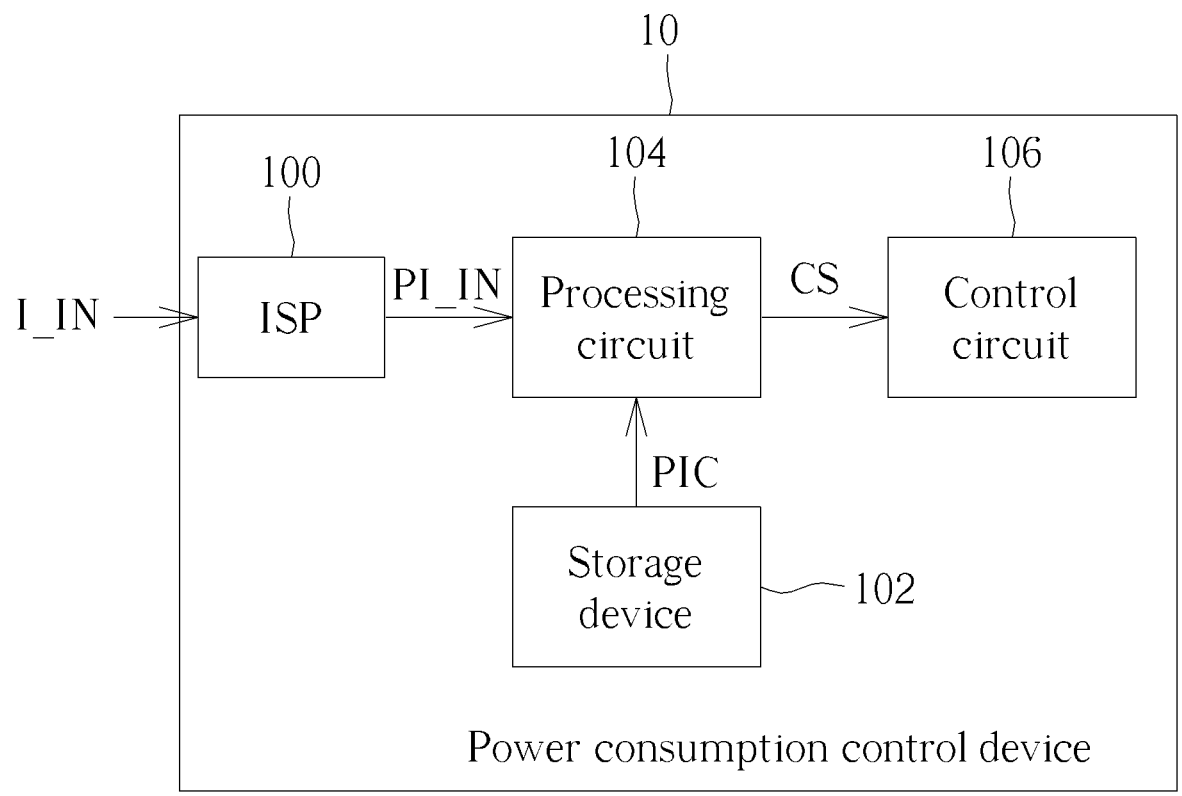
FIG. 1 is a diagram illustrating a power consumption control device according to an embodiment of the present invention.
Figure 2:
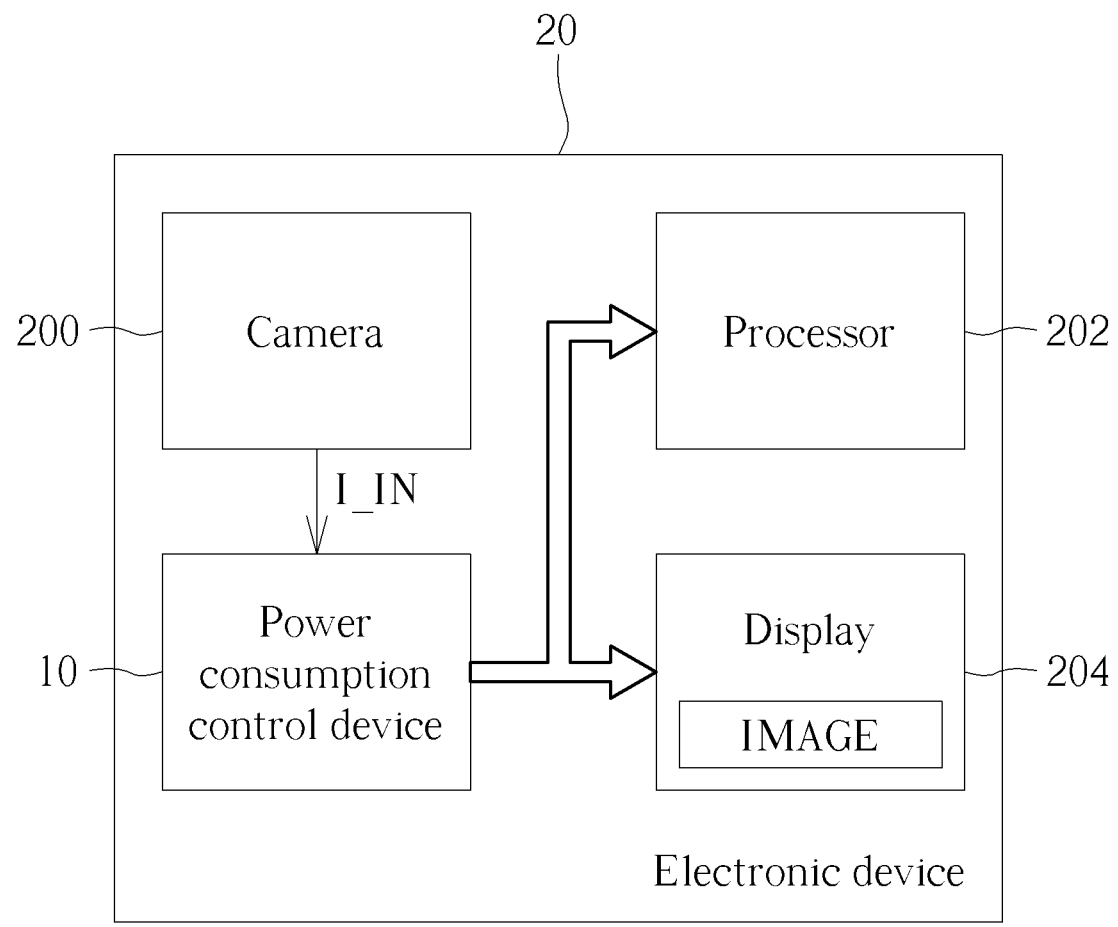
FIG. 2 is a diagram illustrating an electronic device including the power consumption control device shown in FIG. 1 according to an embodiment of the present invention.

Please refer to FIG. 1 in conjunction with FIG. 2. FIG. 1 is a diagram illustrating a power consumption control device 10 according to an embodiment of the present invention. FIG. 2 is a diagram illustrating an electronic device 20 according to an embodiment of the present invention, wherein the electronic device 20 includes the power consumption control device 10 shown in FIG. 1, a camera 200, a processor 202, and a display 204. For example, the power consumption control device 10 may be a system on chip (SoC) disposed on the electronic device 20, but the present invention is not limited thereto. In addition, the electronic device 20 may be a portable electronic device, such as a mobile phone and a laptop.

As shown in FIG. 1, the power consumption control device 10 includes an image signal processor (ISP) 100, a storage device 102, a processing circuit 104, and a control circuit 106. The ISP 100 may be arranged to receive an image signal I_IN captured by the camera 200 of the electronic device 20, and process the image signal I_IN to generate a processed image signal PI_IN. For example, since specifications of the camera 200 may vary, the ISP 100 may perform pre-processing upon the image signal I_IN for subsequent operations. The storage device 102 (e.g. a memory) may be arranged to store at least one predetermined image class (for brevity, labeled as "PIC" in FIG. 1), wherein examples of the least one predetermined image class may include, but are not limited to: human body, human face, human gaze, an enrolled user face of the electronic device, and so on. The processing circuit 104 may be arranged to: receive the processed image signal PI_IN from the ISP 100; receive the at least one predetermined image class from the storage device 102; and analyze the processed image signal PI_IN to detect whether the processed image signal PI_IN belongs to the at least one predetermined image class to generate a control signal CS.

The control circuit 106 may be arranged to switch a mode of the electronic device 20 to a low power mode or a high performance mode according to the control signal CS, wherein power consumption and performance of the electronic device 20 in the low power mode are lower than that in the high performance mode. For example, when the mode of the electronic device 20 is switched to the low power mode, the control circuit 106 may be further arranged to: reduce a speed of the processor 202 of the electronic device 20, reduce a resolution of an image (labeled as "IMAGE" in FIG. 2) displayed on the display 204 of the electronic device 20, and/or reduce a frame rate of the image displayed on the display 204 of the electronic device 20, but the present invention is not limited thereto. In practice, any design for the control circuit 106 that is capable of reducing the power consumption of the electronic device 20 in the low power mode will fall within the scope of the present invention.

For another example, when the mode of the electronic device 20 is switched to the high performance mode, the control circuit 106 may be further arranged to: increase the speed of the processor 202 of the electronic device 20, increase the resolution of the image displayed on the display 204 of the electronic device 20, and/or increase the frame rate of the image displayed on the display 204 of the electronic device 20, but the present invention is not limited thereto. In practice, any design for the control circuit 106 that is capable of enhancing the performance of the electronic device 20 in the high performance mode will fall within the scope of the present invention.

For example, under a condition that a user of the electronic device 20 is not using or looking at the electronic device 20, the processing circuit 104 will detect that the processed image signal PI_IN does not belong to the at least one predetermined image class, and the control signal CS will instruct the control circuit 106 to switch the mode of the electronic device 20 to the low power mode for reducing power consumption.

For another example, under a condition that the user of the electronic device 20 is using or looking at the electronic device 20, the processing circuit 104 will detect that the processed image signal PI_IN belongs to the at least one predetermined image class, and the control signal CS will instruct the control circuit 106 to switch the mode of the electronic device 20 to the high performance mode to enhance performance of the electronic device 20 for better user experience.

Figure 3:
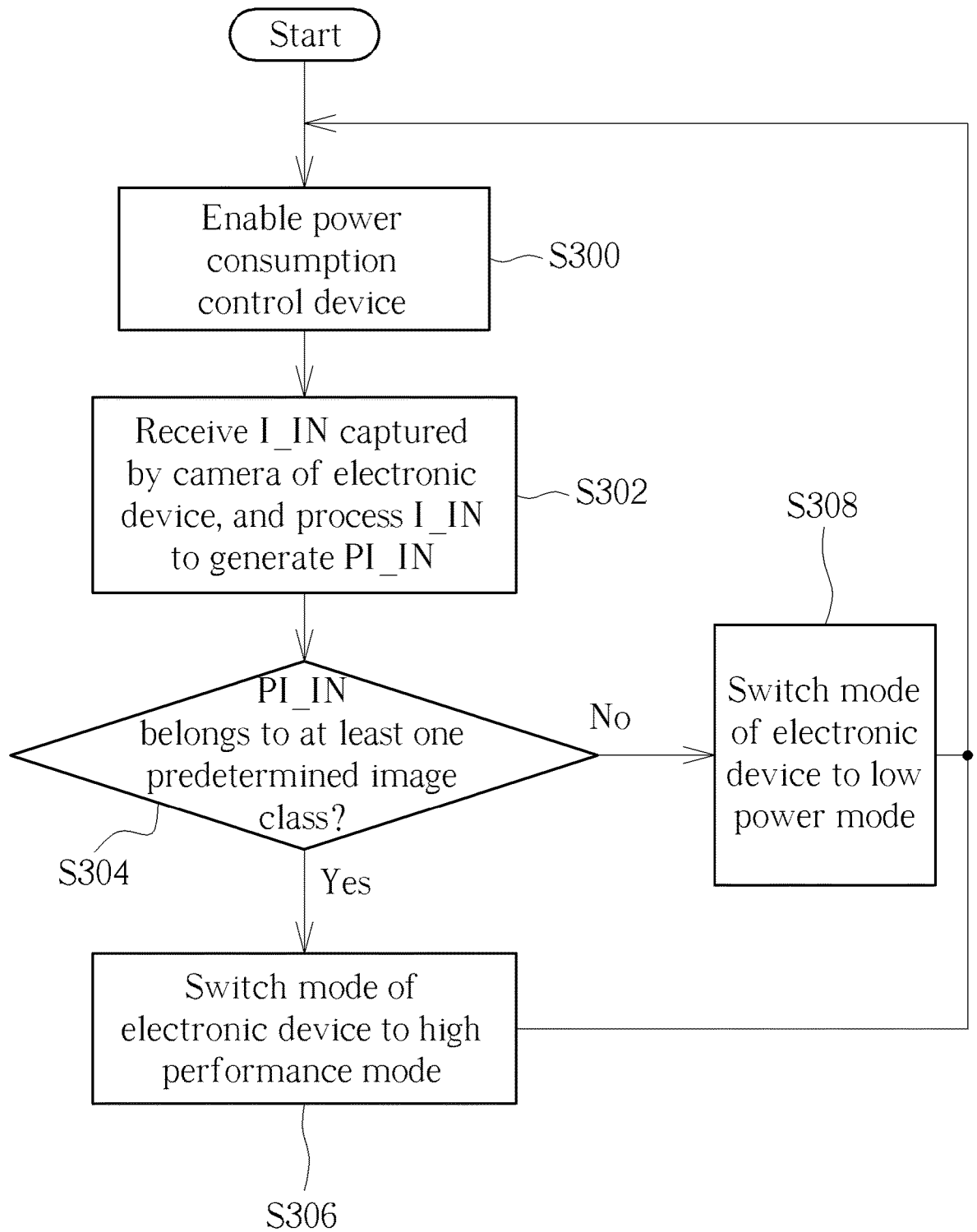
FIG. 3 is a flow chart of a power consumption control method according to an embodiment of the present invention.

FIG. 3 is a flow chart of a power consumption control method according to an embodiment of the present invention. Provided that the result is substantially the same, the steps are not required to be executed in the exact order shown in FIG. 3. For example, the power consumption control method shown in FIG. 3 may be employed by the power consumption control device 10 shown in FIG. 1.

In Step S300, the power consumption control device 10 is enabled.

In Step S302, the image signal I_IN captured by the camera 200 of the electronic device 20 is received, and the image signal I_IN is processed to generate the processed image signal PI_IN.

In Step S304, it is determined that whether the processed image signal PI_IN belongs to the at least one predetermined image class to generate the control signal CS. If yes, Step S306 is entered; if no, Step S308 is returned.

In Step S306, the mode of the electronic device 20 is switched to the high performance mode according to the control signal CS.

In Step S308, the mode of the electronic device 20 is switched to the low power mode according to the control signal CS.

Since a person skilled in the pertinent art can readily understand details of the steps after reading above paragraphs directed to the power consumption control device 10 shown in FIG. 1, further description is omitted here for brevity.

In summary, the power consumption control device 10 of the present invention can analyze the processed image signal PI_IN to detect whether the processed image signal PI_IN belongs to the at least one predetermined image class. In response to the processed image signal PI_IN not belonging to the at least one predetermined image class (e.g. when the user of the electronic device 20 is not using or looking at the electronic device 20), the power consumption control device 10 can switch the mode of the electronic device 20 to the low power mode, which can reduce unnecessary power consumption of the electronic device 20. In response to the processed image signal PI_IN belonging to the at least one predetermined image class (e.g. when the user of the electronic device 20 is using or looking at the electronic device 20), the power consumption control device 10 can switch the mode of the electronic device 20 to the high performance mode, which can enhance the performance of the electronic device 20 and improve user experience. By adaptively switching the mode of the electronic device 20 between the low power mode and the high performance mode, the efficiency of the electronic device 20 can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power consumption control device applied to an electronic device, comprising:
   an image signal processor (ISP), arranged to receive an image signal captured by a camera of the electronic device, and process the image signal to generate a processed image signal;
   a storage device, arranged to store at least one predetermined image class;
   a processing circuit, arranged to:
      receive the processed image signal from the ISP;
      receive the at least one predetermined image class from the storage device; and
      analyze the processed image signal to detect whether the processed image signal belongs to the at least one predetermined image class to generate a control signal; and
   a control circuit, arranged to switch a mode of the electronic device to a first mode or a second mode according to the control signal, and adjust a resolution or a frame rate of an image displayed on a display of the electronic device according to the mode of the electronic device, wherein power consumption and performance of the electronic device in the first mode are lower than the power consumption and the performance of the electronic device in the second mode, and the image displayed on the display of the electronic device is different from the image signal captured by the camera of the electronic device.

2. The power consumption control device of claim 1, wherein when the processed image signal does not belong to the at least one predetermined image class, the control circuit is arranged to switch the mode of electronic device to the first mode according to the control signal.

3. The power consumption control device of claim 2, wherein when the mode of the electronic device is switched to the first mode, the control circuit is further arranged to reduce a speed of a processor of the electronic device.

4. The power consumption control device of claim 2, wherein when the mode of the electronic device is switched to the first mode, the control circuit is further arranged to reduce the resolution of the image displayed on the display of the electronic device.

5. The power consumption control device of claim 2, wherein when the mode of the electronic device is switched to the first mode, the control circuit is further arranged to reduce the frame rate of the image displayed on the display of the electronic device.

6. The power consumption control device of claim 1, wherein when the processed image signal belongs to the at least one predetermined image class, the control circuit is arranged to switch the mode of electronic device to the second mode according to the control signal.

7. The power consumption control device of claim 6, wherein when the mode of the electronic device is switched to the second mode, the control circuit is further arranged to increase a speed of a processor of the electronic device.

8. The power consumption control device of claim 6, wherein when the mode of the electronic device is switched to the second mode, the control circuit is further arranged to increase the resolution of the image displayed on the display of the electronic device.

9. The power consumption control device of claim 6, wherein when the mode of the electronic device is switched to the second mode, the control circuit is further arranged to increase the frame rate of the image displayed on the display of the electronic device.

10. The power consumption control device of claim 1, wherein the at least one predetermined image class includes human body, human face, human gaze, or an enrolled user face of the electronic device.

11. The power consumption control device of claim 10, wherein when the processing circuit detects that a user is not using or looking at the electronic device by detecting that the processed image signal does not belong to the at least one predetermined image class, the control circuit switches the mode of the electronic device to the first mode.

12. The power consumption control device of claim 10, wherein when the processing circuit detects that a user is using or looking at the electronic device by detecting that the processed image signal belongs to the at least one predetermined image class, the control circuit switches the mode of the electronic device to the second mode.

13. A power consumption control method for an electronic device, comprising:
   receiving an image signal captured by a camera of the electronic device, and processing the image signal to generate a processed image signal;
   analyzing the processed image signal to detect whether the processed image signal belongs to at least one predetermined image class to generate a control signal;
   switching a mode of the electronic device to a first mode or a second mode according to the control signal, wherein power consumption and performance of the electronic device in the first mode are lower than the power consumption and the performance of the electronic device in the second mode; and
   adjusting a resolution or a frame rate of an image displayed on a display of the electronic device according to the mode of the electronic device, wherein the image displayed on the display of the electronic device is different from the image signal captured by the camera of the electronic device.

14. The power consumption control method of claim 13, wherein switching the mode of the electronic device to the first mode or the second mode according to the control signal comprises:
   in response to the processed image signal not belonging to the at least one predetermined image class, switching the mode of electronic device to the first mode according to the control signal.

15. The power consumption control method of claim 14, wherein in response to the mode of the electronic device being switched to the first mode, a speed of a processor of the electronic device is reduced.

16. The power consumption control method of claim 14, wherein in response to the mode of the electronic device being switched to the first mode, the resolution of the image displayed on the display of the electronic device is reduced.

17. The power consumption control method of claim 14, wherein in response to the mode of the electronic device being switched to the first mode, the frame rate of the image displayed on the display of the electronic device is reduced.

18. The power consumption control method of claim 13, wherein switching the mode of the electronic device to the first mode or the second mode according to the control signal comprises:
   in response to the processed image signal belonging to the at least one predetermined image class, switching the mode of electronic device to the second mode according to the control signal.

19. The power consumption control method of claim 18, wherein in response to the mode of the electronic device being switched to the second mode, a speed of a processor of the electronic device is increased.

20. The power consumption control method of claim 18, wherein in response to the mode of the electronic device being switched to the second mode, the resolution of the image displayed on the display of the electronic device is increased.

21. The power consumption control method of claim 18, wherein in response to the mode of the electronic device being switched to the second mode, the frame rate of the image displayed on the display of the electronic device is increased.

22. The power consumption control method of claim 13, wherein the at least one predetermined image class includes human body, human face, human gaze, or an enrolled user face of the electronic device.

23. The power consumption control method of claim 22, wherein when detecting that a user is not using or looking at the electronic device by detecting that the processed image signal does not belong to the at least one predetermined image class, the mode of the electronic device is switched to the first mode.

24. The power consumption control method of claim 22, wherein when detecting that a user is using or looking at the electronic device by detecting that the processed image signal belongs to the at least one predetermined image class, the mode of the electronic device is switched to the second mode.

\* \* \* \* \*